Figure 1:
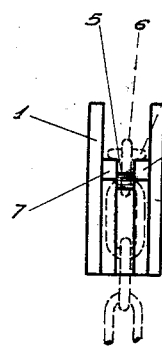

Dec. 27, 1932.   J. SEGIMÓN   1,892,411

CHAIN AND KNOT BINDER

Filed Jan. 29, 1931   2 Sheets-Sheet 1

INVENTOR:
JOSÉ SEGIMÓN
BY: Rueger, Boyer + Batalan
ATTORNEYS.

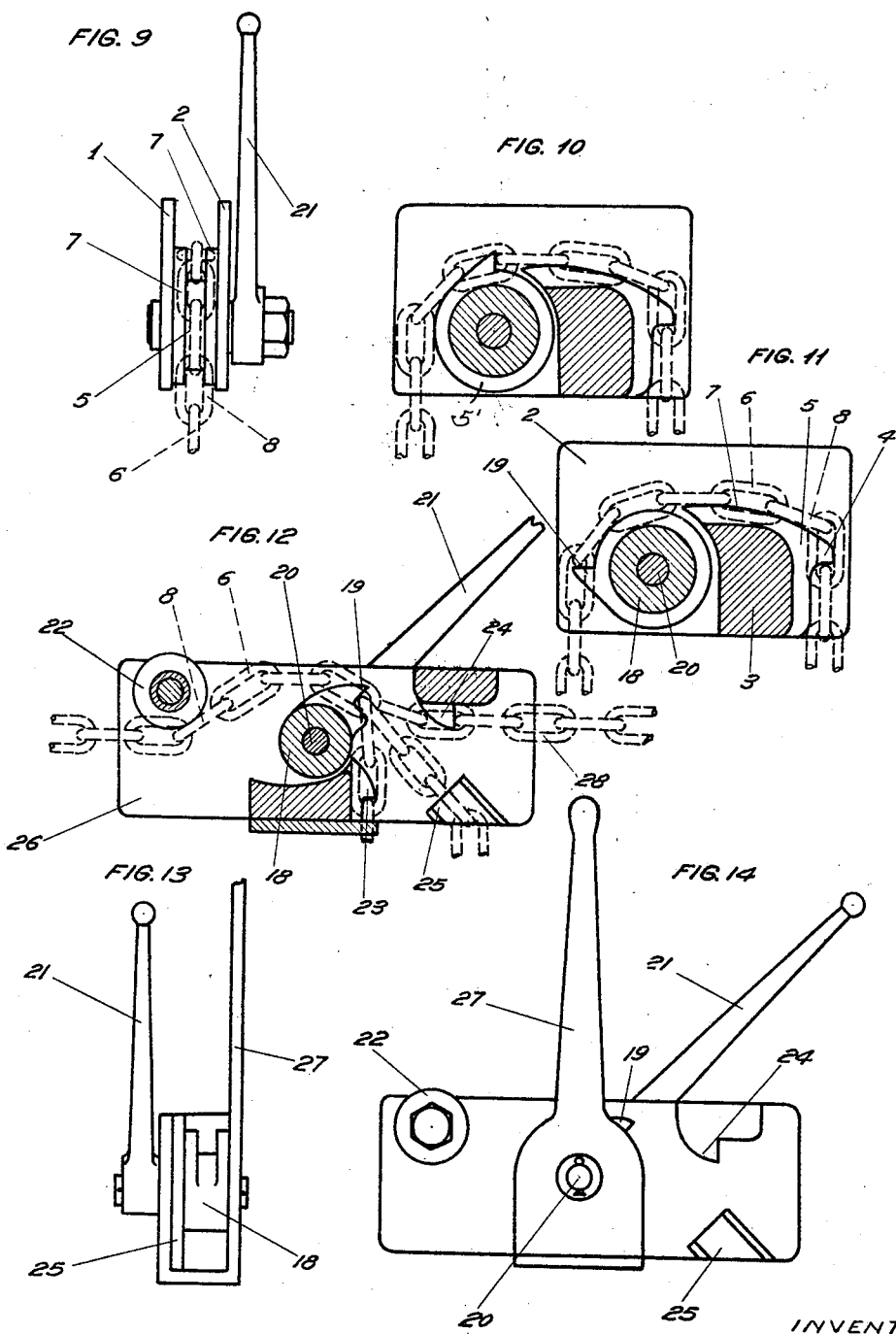

Patented Dec. 27, 1932

1,892,411

UNITED STATES PATENT OFFICE

JOSÉ SEGIMÓN, OF BARCELONA, SPAIN

CHAIN AND KNOT BINDER

Application filed January 29, 1931, Serial No. 511,939, and in Spain December 29, 1930.

The variety of the practical uses that can be applied to chain and knot binders, as described in Letters Patent No. 1,786,187, dated December 23, 1930, granted to Dolores de Plandolit y Bordas, has originated the introduction of certain improvements in the construction of same, for their adaptability to the use which may be made of them in each case, without altering the fundamental principle of same, duly specificated in the said patent.

The object of this consists essentially in a retaining element of a chain or knotted string, formed by a guide over which the chain or knotted cord slides, with a slot at one end, in such a way that, when the chain or cord moves one way or the other, it will always run over the said slot. These patented clasps, however, are limited to a chain guide, having a flat bottom, and when said chain comes from a place below the plane of said bottom, the abrupt change of direction of the chain renders its entrance into the fastener very harsh, on account of the chain links striking against the edges, so that to let the chain be easily pulled through, said clasps have been provided with a curved or bent surface at the entrance, said chain thus entering tangentially. To make this improvement still more perfect the curved bottom will be longitudinally grooved to keep the edgewise links standing and the flatwise in a flatways position. Once this is settled, if the chains are made to run outwards from the guide no links will slip into the slot and even should there be any edgewise link in the said slot, it will slide out and no retaining action will take place. Should any other action originate a movement to the opposite direction the first edgewise links will tend to lodge in the said slot, and so they will undoubtedly do, but the next flatwise one, will not be able to pass, and the chain will be held.

The improvements in question consist in variations of execution of the principle described, and of several constructive forms of same for its adaptation to a number of cases which it can be applied to. It must be understood that the various constructive forms described can and may be employed independently one from the other, as described, but may, nevertheless, be combined together as far as it may be possible and practical.

In the drawings, the improvements mentioned are illustrated, in divers forms of practical application.

Figure 2:
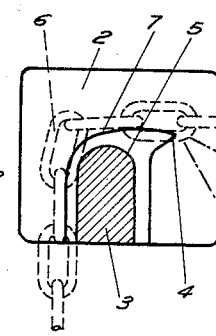
Figure 3:
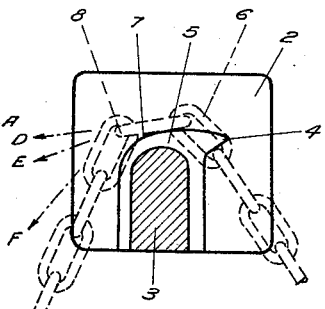
Figure 4:
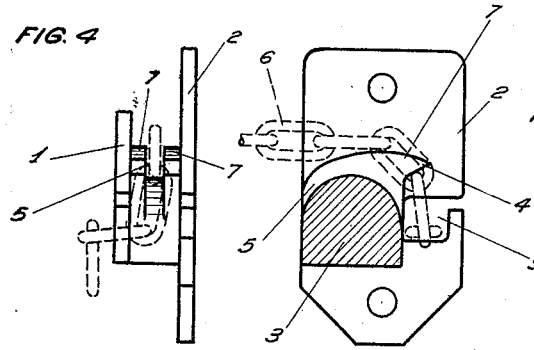
Figure 5:
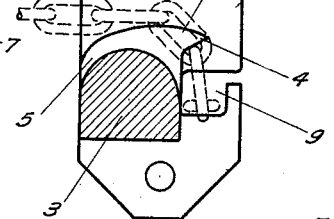

In Figures 1, 2 and 3 a type of the retaining binder of the indicated kind is shown, Fig. 1 being an edge view, and Figs. 2 and 3 longitudinal sections of same. In Figs. 4 and 5, a variation of the aforementioned appliance is shown, the first one being an edge view, and the second, a longitudinal section.

Figure 6:
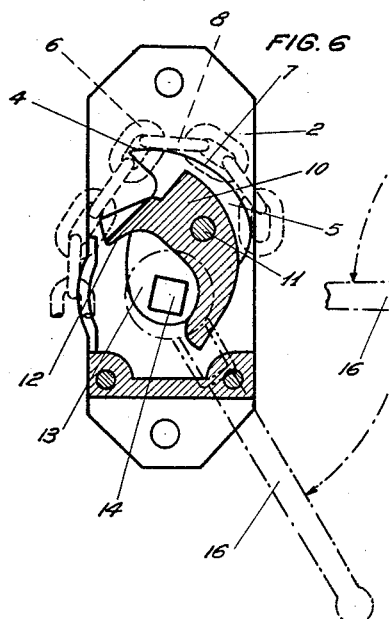
Figure 7:
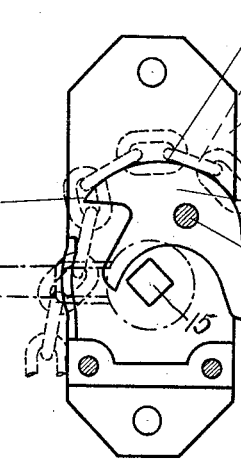
Figure 8:
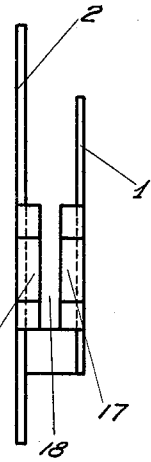

Another construction of the binder, with chain tightener, is shown, in a front view, in two different phases of operation, in Figs. 6 and 7, and in Fig. 8 is seen a side projection of the body or frame of same.

In Figures 9, 10 and 11 are shown respectively: total side view and two phases of operation, in longitudinal section, of the type of binder with means for straining and dragging the chain or knotted cord.

Finally, a variety of the form of construction mentioned in last place, is shown in Figs. 12, 13 and 14. Fig. 12 is a longitudinal section and Figs. 13 and 14 two side views of the same.

The binder illustrated in Figs. 1, 2 and 3 comprises two side plates, 1 and 2, between which enough space is left for the chain to pass through. Between the said plates is placed a solid piece (3) which is peripherally grooved to form a channel 5 having a convexly curved bottom wall, the outer edges of the side walls 7 of said channel being similarly curved at the side where the chain enters the channel, while at the opposite edge of the member 3 said side walls follow a straight line and form a pair of hook-shaped points 4. The channel 5 is of a suitable width and depth to allow an edgewise link (6) to pass, while the outer edges of the side walls 7 form partly curved and partly straight ways over which the flat links (8) of the chain may slide.

When the chain is placed in the binder mentioned, if it is pulled in the direction indicated by the arrows A, B, C, of Fig. 2, the chain will run smoothly, but, upon being left free, the chain will fall by its own weight into the position shown in Fig. 3 and if it is then pulled in the opposite direction, that is to say, towards the arrows D, E, F, G, an edgewise link, the nearest to the points (4) of the projected side walls 7 will enter between said points, but the next flatwise link will abut against the lower parts of the said points, and so the chain will be retained.

The device described may be provided with any mechanical means whatever that may serve to separate the chain, when it is held in the manner described, from under the points (4) in such a way that the chain may slide freely in both directions. Since the mechanical means that may be adapted to this purpose can be very variable, it is not detailed in the present specification, nor is it illustrated in the drawings. This variation is suited for chains that pass through operating wheels, in one direction or another, without distinction, and through wheels that will engage the chain links in one direction only.

Furthermore, in order to prevent, in this type of binder, the chain from slipping accidentally, for instance, through a shock that may jerk the chain out from the slot, the variation shown in Figs. 4 and 5, has been provided. In this variation the retaining elements are the same as in the case mentioned before with the sole difference that in one or both side walls (1 and 2) a slot (9) is made which opens in an outward direction through a narrow passage which only allows the passage of a single link of the chain placed edgewise. The said slot widens towards the bottom, and here (at the bottom) a flat link can be laid, which occupies a place below the entrance to same. When the chain is lodged in the said slot, it cannot escape by accident, however strong the shock that the device may have to stand.

On the other hand, the situation of this slot in relation to the retaining surface (4), contributes to assure the most adequate position for fixing the chain firmly and safely.

In the binders described the point of retention of the chain is graduated by means of the edgewise links (8), so that the difference between one degree of retention and another is determined by the distance between two consecutive edgewise links (8). In this manner, it may happen in some cases that the chain remains loose when retained at a certain link and too tight or impossible to fix at the next link. In order to eliminate this difficulty, the form of construction corresponding to Figures 6, 7 and 8, has been developed. This consists, essentially, in the placing of the nucleus (3) of the above described form of construction to constitute an element independent from the plates 1 and 2 and susceptible of rotating on an axle upon which it is mounted.

Therefore, in this case, the appliance comprises plates 1 and 2 between which is placed an oscillating nucleus (10) forming the hook with points (4), the groove or slot (5) and the projecting sides or ways (7) for the flat links (8). Furthermore, the nucleus itself presents in its interior a recess (12) in which a piece, in the shape of an eccentric wheel (13) mounted upon an axle (14) which at one end forms a head (15) is mounted. Besides this, the wall plates 1 and 2 have at their front ends, towards which the chain slides, supplementary flanges 17, facing one another, between which enough space 18, for the passage of an edgewise link is left. In said device, once the chain is placed in the usual manner, as in Fig. 6, the lever 16 will be turned around axle 14, in the opposite direction to the arrow at Fig. 6, until said lever reaches the position shown at Fig. 7, by another arrow. Said turning motion of lever 16, will be shared by the eccentric wheel 13, and the change of position of said wheel that bears against the back face of the recess 12 of nucleus 10, will compel it to oscillate forwards around axle 11, in the same direction as shown by the arrow at Fig. 7. Said oscillating motion of nucleus 10, will determine the travel of teeth 4, which will advance a certain number of degrees, from the position shown at Fig. 6, to that of Fig. 7. As said teeth 4 engage a flatwise link 8, the chain will be dragged along with them, whenever said advancing motion is produced, thus causing the desired tightening effect on the chain. Besides this, as said teeth approach said flanges 17, the flatwise link engaged by said teeth will get caught inside, between said flanges 17, points 4 and nucleus 10. If said lever 16 is then taken off, the chain will, thus, remain locked, said lever acting as a key, to be replaced to operate the eccentric wheel backwards, when required.

As has been said already, by means of this type of construction, the chain can be made to advance a fraction or more of the space existing between two consecutive links, either flat or edgewise, but in practice, cases may be found in which the said advance is not sufficient and for those cases, the combination of both types described has been looked for, that is to say, a type of binder has been sought, combining movable guides or strips and fixed ones and, as a variety, the disposition of two movable guides.

This new way of construction is shown in Figures 9, 10 and 11. This binder has plates 1 and 2 between which a fixed nucleous (3) is placed as in the case of Figures 1 and 3 and an oscillating nucleus formed by a pulley (18) with a passage (5') provided with points (19) placed in the same direction as (4) of the fixed nucleus (3). The pulley (18) is mounted on an axle (20) which is elongated and bears upon it the operating lever (21). When a chain is placed as in Fig. 10, if said pulley 18 is turned back to the left, till it reaches the position shown at Fig. 11, said teeth 19 acting as an eccentric, will lift the flatwise link situated behind and the teeth will slide smoothly down. It will, then, be seen, that two motions are possible, one of the chain relative to the nucleus and the other of the nucleus relative to the chain. The chain will not move at all as it is held fast by the teeth 4 of the fixed nucleus 3. Once the pulley 18 is in the position of Fig. 11, a flatwise link is engaged by the teeth 19, and, if then, by means of the lever, said pulley 18 is turned up to the right, said teeth will draw the chain up, the chain situated between said pulley 18 and the fixed nucleus 3 will become loose and pushed so as to deliver a new flatwise link to the teeth 4 of the fixed nucleus 3. By moving lever 21 to and fro, through an adequate distance, an advance of a flatwise link each time will be secured.

The fastener described has all the elements of a tensor or of a traction or elevating device and may be used in every case in which both the point of origin of the chain and the direction taken by same, upon issuing from the apparatus, are placed lower down than the fastener itself.

Figs. 11 and 10, show the chain coming from some point situated vertically underneath the teeth 19 of the pulley 18, so that said chain encircles it closely, for about 90 degrees of its perimeter, which is a distance long enough to allow the pulley teeth 19, to engage the chain at the position of Fig. 11 and drag it along to that shown at Fig. 10. If said chain, instead, came to the binder horizontally or from a still higher point, the described operation could not be performed, as said chain would not be in touch with the pulley teeth for a distance long enough to allow said teeth 19, to engage a flatwise link. Besides, if said chain, at the outlet, were directed to a point situated higher up, than what it should be to let a flatwise link be held by the points 4, this device would not work either. In order to avoid such difficulties, a variation in the binder just described has been invented and shown in Figs. 12, 13 and 14.

The variation referred to, consists in adding to the mechanism already described, a roller guide (22) by means of which, whatever might be the direction of the chain when it enters the mentioned binding device, it adopts a suitable position to be reached by the points, teeth or prominences (19) of the pulley (18). Furthermore, this device comprises two fixed binding posts, one (23) with a horizontal tooth, and the other (24) with a vertical one. In this manner, when said chain leaves the movable binding nucleus 18 and is directed vertically downwards, said chain will come in contact with the fixed retaining nucleus 23, where a flatwise link will be held each time that a backward motion is initiated. Whereas, if said chain, at the outlet, is, instead, directed in a horizontal direction, then, it will be in contact with the fixed retaining nucleus 24, which will produce an equal effect to that of nucleus 23. In case it may be required to leave said chain out of the radius of action of both fixed retaining nuclei 23 and 24, the device carries a guide in the shape of a channel 25 into which said chain will be placed in order to let it pass clear of the teeth of both nuclei 23 and 24.

The system of construction shown is calculated to form a loose element which is inserted at a convenient point of a chain. For this purpose, the frame (26) of same is provided with an arm (27) which constitutes a means of holding same with the hand, while lever (21) operating the movable nucleus (18) is worked with the other hand. Nevertheless, this type of fastener can be made for placing at a fixed spot or to carry the opposite end of the very chain which it displaces, strains and holds, for which purpose it is provided with a suitable hook at the frame end (28).

The divers types of construction described may be varied in their accessory form, in their dimensions, and in the material out of which their parts be made.

They will also vary in the use and application they may be given and in the combinations that may be possible between one and the other.

And what I, therefore, claim is:

1. A device of the character described, comprising a pair of plates, a solid connecting member disposed between said plates and maintaining them in spaced relation, said connecting member being provided with a peripheral channel disposed centrally thereof, the bottom wall of said channel being of convex formation transversely of the connecting member and the outer edges of the side walls of said channel conforming to the curvature of the bottom wall at one edge of said solid member and merging into straight portions at the opposite edge of said member.

2. A device of the character described, comprising a pair of plates, a solid connecting member disposed between said plates and maintaining them in spaced relation, said connecting member being provided with a peripheral channel disposed centrally thereof, the bottom wall of said channel being of convex formation transversely of the connecting member and the outer edges of the side walls of said channel conforming to the curvature of the bottom wall at one edge of said solid member and merging into straight portions forming hooks extending beyond the opposite edge of said member.

3. A device of the character described, comprising a pair of plates, a solid connecting member disposed between said plates and maintaining them in spaced relation, said connecting member being provided with a peripheral channel disposed centrally thereof, the bottom wall of said channel being of convex formation transversely of the connecting member and the outer edges of the side walls of said channel conforming to the curvature of the bottom wall at one edge of said solid member and merging into straight portions forming hooks extending beyond the opposite edge of said member, each of said plates being provided with an opening disposed immediately below said hook-shaped portions.

In testimony whereof I have signed my name to this specification.

JOSÉ SEGIMÓN.